Patented Oct. 13, 1942

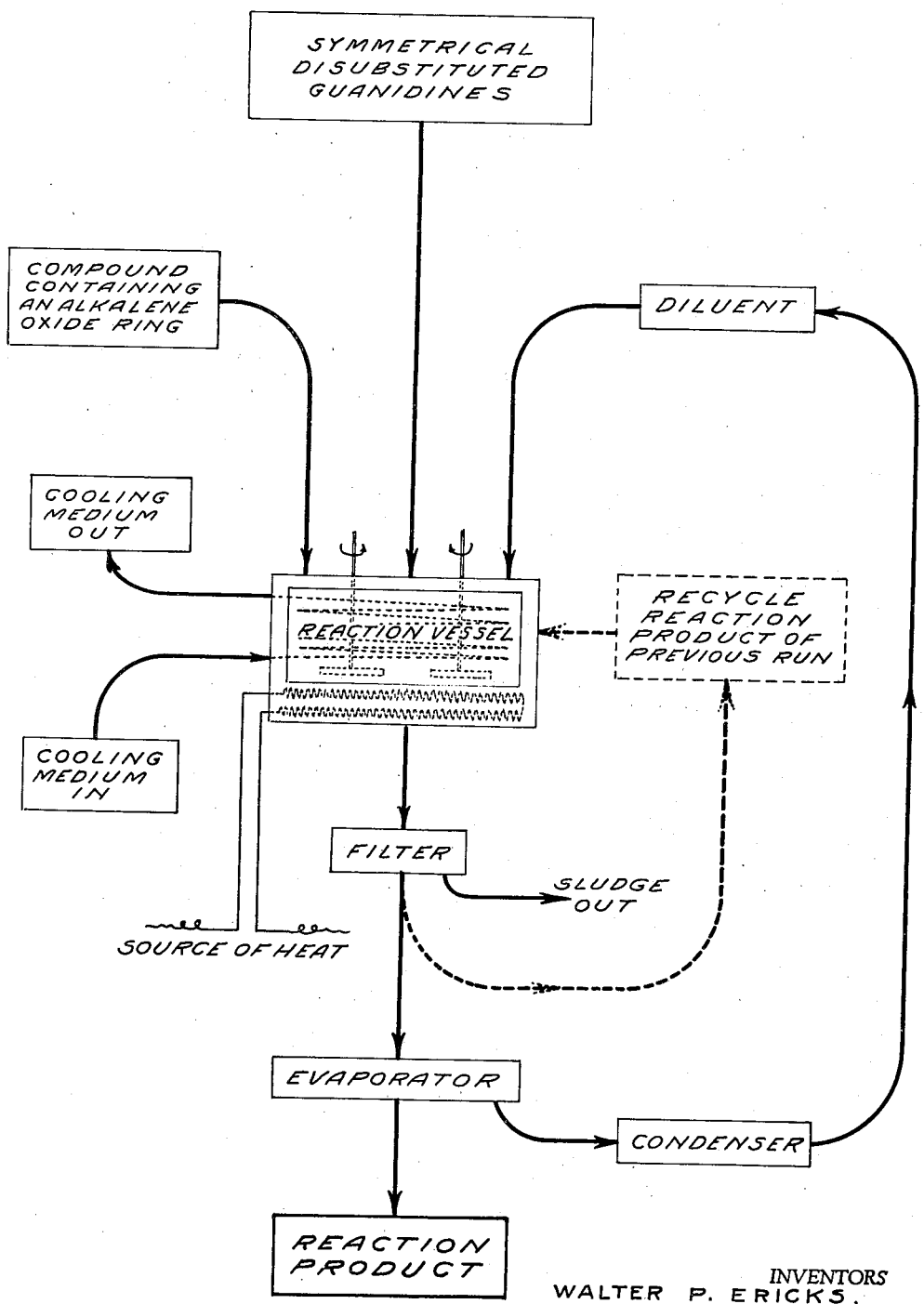

2,299,012

UNITED STATES PATENT OFFICE 2,299,012

SYMMETRICAL DISUBSTITUTED ALKYLOL GUANIDINES

Walter P. Ericks, Cos Cob, and James H. Williams, Riverside, Conn., assignors to American Cyanamid Company, New York, N. Y., a corporation of Maine Application January 30, 1941, Serial No. 376,619

1 Claim. (Cl. 260—564)

This invention relates to the preparation of new and useful condensation products of alkylene oxides and symmetrical disubstituted guanidines.

More particularly, it embraces the preparation of condensation products obtained when alkylene oxides are reacted with guanidines having the general formula:

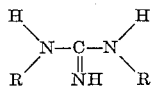

wherein both R's represent identical organic radicals which may be alkyl, aryl, aralkyl, alicyclic or heterocyclic radicals. Among the alkylene oxides which may be used herein are ethylene oxide, glycidol, glucosan, sugar anhydrides containing an ethylene oxide ring or compounds capable of yielding an intermediate containing an alkylene oxide ring in the course of the reaction, such as ethylene chlorohydrin, chloroglycerol, epichlorhydrin, and the like.

It is an object of this invention to prepare these compounds cheaply and efficiently. A still further object is to prepare surface active materials which find use as textile and leather assistants and in the paper, lacquer, resin, cosmetic and similar industries as highly effective wetting, emulsifying and detergent agents. The products of this invention are especially useful for softening purposes as well as anti-crease and wrinkle prevention in cloth, leather, fabricoid and similar materials and are particularly valuable when used as alkali and acid resistant wetting, detergent and emulsifying agents, as well as for the resolution of emulsions such as petroleum-water emulsions. They also find use as mercerizing assistants. Among the compounds herein described, those containing heterocyclic substituents have the valuable faculty of inducing local anaesthesia when applied or injected subcutaneously. They also display effective vaso-constrictor properties and when used as such only a very small amount of the heterocyclic product is necessary. Further and more important uses are suggested in the following description.

With these objects in view and such others as may hereinafter appear, the invention consists in the novel products and processes described below and more particularly defined in the claim.

The accompanying flow sheet represents the process diagrammatically. As shown the necessary reactants are mixed together with a diluent or as alternatively shown in broken lines with a portion of a recycled liquid reaction product. The product is then obtained by evaporation of the diluent.

The compounds of this invention are prepared in general by reacting a symmetrical substituted guanidine with a compound containing an ethylene oxide ring. If desired the reaction may be accelerated by using a temperature of 150° to 200° C. and a suitable organic or inorganic base, preferably an alkali-metal or alkaline earth metal hydroxide such as sodium hydroxide, potassium hydroxide, calcium hydroxide, a pyridine and the like. Usually the reaction is exothermic and hence must be controlled as by the use of an efficient cooling device. The reaction product is then filtered, evaporated, and if necessary, further purified by solvent extraction. Instead of a compound containing an alkylene oxide ring, an epihalogenhydrin may be used, or a similar substance having a radical which under the conditions of the reaction forms an intermediate having an alkylene oxide ring.

The following examples illustrate the invention in still further detail:

Example I 19.55 g. of 1,3-didodecyl guanidine (0.05 mol.), 6.3 g. of ethylene oxide (0.15 mol.) and 40 g. of dioxane as solvent were charged into a steel bomb previously cooled to 0° C. Constant stirring and heating of the reactants to 70° C. over a period of 35 minutes caused a pressure increase to 30 pounds per square inch. The temperature was maintained at 70° C. for 3 hours during which interval the pressure gradually decreased to normal. Cooling the bomb and evaporating the dioxane from the reaction mixture with the aid of a steam bath yielded the product, 1,3-didodecyl-2-ethoxyethyloxyethylol guanidine, as a brown colored wax which was easily dispersible in water and possessed excellent surface-active properties.

Example II 12.0 g. of 1,3-di-o-tolyl guanidine and 14.8 g. of glycidol were stirred and heated to 150° C. in a beaker on a hot plate. At this temperature an exothermic reaction occurred and the temperature was held at 150° to 160° C. for 15 minutes by cooling the reaction mixture on a water bath. Further cooling yielded the desired product as a pale yellow, pliable, transparent resin which was insoluble in cold water and only sparingly soluble in hot water.

*Example III*

9.3 g. of 1,3-dipyridyl guanidine, 1.7 g. of ethylene oxide and 20 g. of dioxane were reacted at 150° C. under superatmospheric pressure for 2 hours. The product was evaporated under reduced pressure to concentrate the solution and crystallize out the product which is easily separated by cooling and filtering. The filter cake was recrystallized from ethyl alcohol in the form of a white amorphous powder, 1,3-dipyridyl-2-ethylol guanidine. This compound is a valuable therapeutic agent. It has a rapid local anasthetic action and also functions as a vasoconstrictor, being highly effective when used in relatively small amounts.

*Example IV*

The product of Example III prepared by the following alternative method is likewise possessed of useful therapeutic properties:

9.3 g. of dipyridyl thiourea, 31 g. of basic lead carbonate and 2.7 g. of ethanolamine were heated in alcohol at 45° C. for 10 hours with constant agitation. The product was then filtered and the filtrate evaporated to a relatively small volume, then cooled and the product separated by filtration. The filter cake, recrystallized from ethyl alcohol solution gave 1,3-dipyridyl-2-ethylol guanidine as a white amorphous powder. The salts may be readily obtained by dissolving this product in ethyl alcohol and neutralizing the solution with hydrochloric acid, whereupon the hydrochloride separates out upon the addition of ether. The hydrochloride is very soluble in water, slightly soluble in alcohol but insoluble in ether. The sulfate produced in a similar manner has corresponding properties and melts after recrystallization from alcohol at 174° to 175° C.

These condensation products obtained by reacting a compound containing an ethylene oxide ring and a symmetrical disubstituted guanidine are of particular utility as surface-active agents of the cation-active type. For this reason they are well suited for wetting and softening wool, cotton, cellulose acetate, cellulose nitrate, viscose and similar materials. They are also useful in the emulsification of mineral oil, glycerides, fats, oils and the like. They find application in the formulation of printing inks, dye pastes, dye baths, leather preparations and flotation agents. By their use it is possible to secure fullness, resistance to unraveling, and increased wet strength in rayons and other fabrics. They reduce the tendency of treated cloth materials to wrinkle or crease.

These products, particularly those having waxy or paste-like properties are useful assistants in the textile, leather, paper, rubber, lacquer and similar industries. Some of these compounds herein described, particularly the alkylol guanidines which are disubstituted with short chain hydrocarbon radicals such as dimethyl, diethyl, dibutyl and the like, are effective anti-oxidants for oils and soaps and prevent incipient deterioration and rancidity therein.

In addition to the symmetrical disubstituted guanidines above mentioned various others may be condensed with alkylene oxides. Among such compounds, the di-alkyl guanidines include 1,3-dimethyl guanidine, 1,3-diethyl guanidine, 1,3-diamyl guanidine, 1,3-dioctyl guanidine, 1,3-didodecyl guanidine, and the like. Corresponding symmetrical disubstituted aryl guanidines and symmetrical disubstituted heterocyclic guanidines such as 1,3-dithiazyl guanidine, 1,3-dipyrimidyl guanidine, and the like, can also be reacted with alkylene oxides such as ethylene oxide, glycidol, glycosans and the like to give commercially useful condensation products.

It is to be understood that the examples given herein are merely specific embodiments of this invention and that the latter is to be broadly construed within the purview of the appended claim.

We claim:

As a new product, 1,3-didodecyl-2-ethoxyethylol guanidine.

WALTER P. ERICKS.
JAMES H. WILLIAMS.